UNITED STATES PATENT OFFICE.

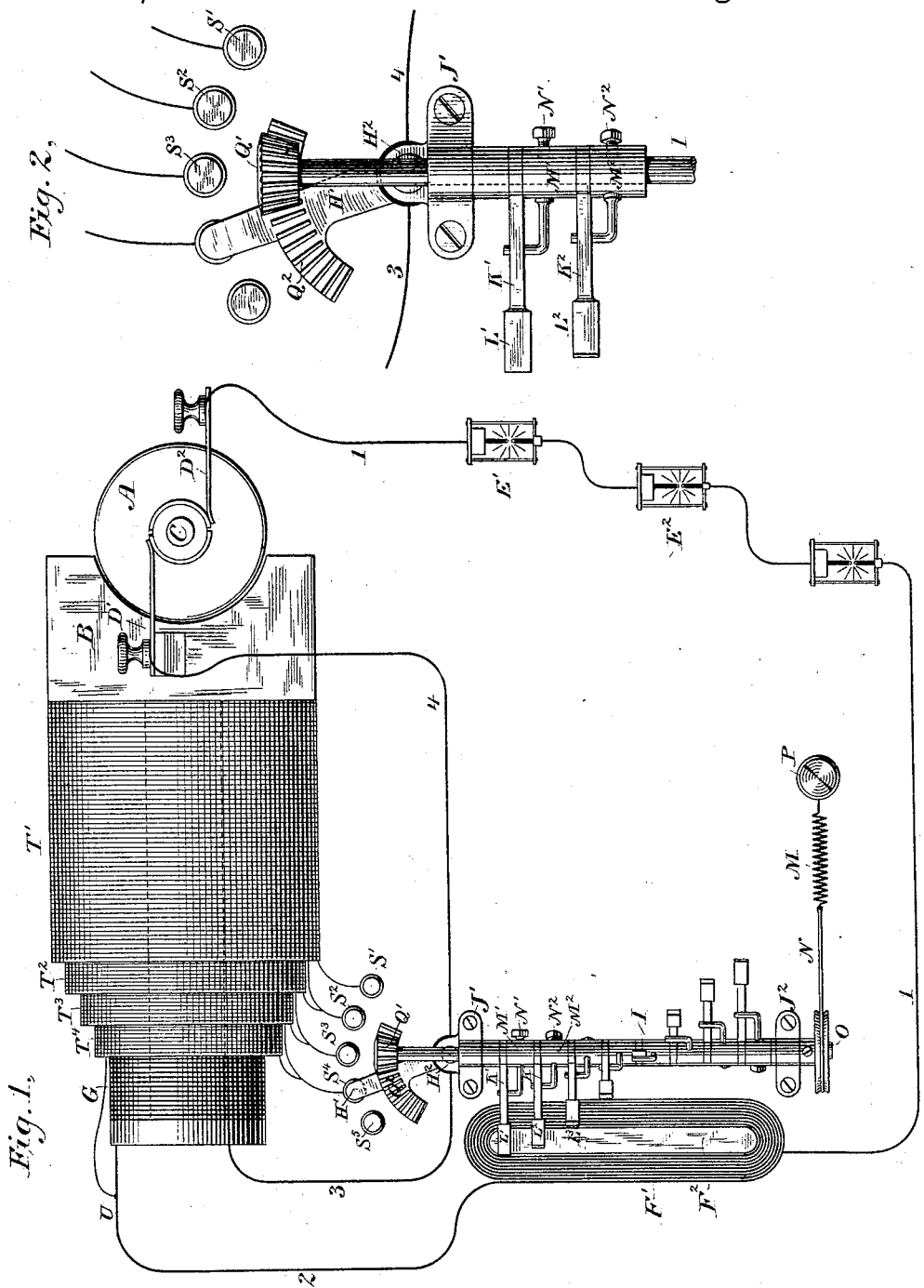

ROBERT J. SHEEHY, OF NEW YORK, N. Y.

REGULATOR FOR DYNAMO-ELECTRIC MACHINES.

SPECIFICATION forming part of Letters Patent No. 283,155, dated August 14, 1883.

Application filed August 18, 1882. (No model.)

*To all whom it may concern:*

Be it known that I, ROBERT J. SHEEHY, a citizen of the United States, residing in the city, county, and State of New York, have invented a new and useful device for regulating and governing the strength of current in the circuit supplied by an electric generator, of which the following is a specification.

My invention relates to a certain class of devices or appliances, the object of which is to automatically maintain the desired uniformity in the strength of current traversing the circuit of a dynamo-electric machine. It is well known that the strength of current within such a circuit is subject to fluctuations, these being due to a variety of causes—such, for example, as variations in the speed with which the armature is propelled, or changes in the resistance of the external circuit due to the introduction of electric lights into or the withdrawal of them from the said circuit.

My invention therefore consists in a method of and apparatus for maintaining a uniform strength of current throughout the working-circuit of a dynamo-electric machine, which method may be, in general, described as follows:

The fluctuations in the strength of current generated by a dynamo-machine cause corresponding variations in the magnetic force created in the pole-pieces of any electro-magnet vitalized by said current. These magnetic variations I employ as a source of power whereby to operate a switch in such manner as to introduce into or withdraw from a shunt-circuit spanning the helices of the field-magnets one or more convolutions of fine wire surrounding said field-magnet helices, through which fine-wire helices the current passes in such direction as to more or less demagnetize said field-magnets.

My invention also embraces certain details of mechanism, the subject-matter claimed being hereinafter specifically designated.

My invention is exhibited in the accompanying drawings, in which Figure 1 is a general diagram of a dynamo-electric generator operating in conjunction with my device, and Fig. 2 is a detailed view of the form of switch and means of driving the same which I find convenient to employ.

Referring to Fig. 1, I have therein shown the essential elements of a dynamo-electric machine, of which A is the armature; B, the pole-piece of the field-magnet; C, the commutator; D′ and D², the brushes. From the brush D² the circuit may be traced by line 1, (in which may be placed the devices to be actuated—as, for example, the electric lights E′ E², &c.,) electro-magnet F′, line 2, main magnetizing-helix G of the field-magnet, line 3 fulcrum H² of switch H′, and *via* line 4 to brush D′. The current in traversing this course will vitalize the electro-magnet F′, which will exhibit variations of magnetism correlative to the variations of the strength of said current. By means of these variations I cause the revolutions of the shaft I in the following manner:

The shaft I is capable of revolving in the bearings J′ and J², between which it carries a series of small armature-levers, K′ K², &c., severally provided with soft-iron armature-pieces, L′ L², &c. These levers are loosely attached to the shaft I, which is provided with the fixed brackets M′ M², &c., securely attached to said shaft by binding-screws N′ N², &c., serving to communicate at times the motion of said shaft to the armature-levers K′ K², &c. The brackets M′ M², &c., are arranged spirally upon the shaft I. The pole-piece F², I prefer to electroplate with some diamagnetic metal, in order to prevent excessive adhesion of the armatures thereto. Assuming, now, that the shaft I is in the position shown in the figure, it will be evident that when a current traverses the coils of the magnet F′ a strong attraction will be exerted by the pole-piece F² for the armature L′, while, owing to the spiral arrangement of the brackets, the attraction of the pole-piece for the armature L² will be somewhat less, and that for the armature L³ still less, &c. Assuming the attractive force to be sufficient, it will cause the revolution of the shaft I in opposition to the force of the spring M, one end of which is connected to the cord N, attached to the circumference of the wheel O, while the other end is attached to the screw P, which serves to adjust its tension. By virtue of this attraction the shaft will now turn sufficiently to bring said armature in contact with the pole-piece F² and the armatures L² L³, &c., will now be slightly approached toward said pole-piece. If the magnetic force be still further increased, the armature L² will be attracted sufficiently to further rotate the shaft, as described, causing the bracket M to leave the armature L' in contact with the pole-piece F². The shaft I is in this manner made to revolve through successive parts of a single revolution, the extent of the arc of its revolution being dependent upon the degree of magnetism developed in the pole-piece F² of the electro-magnet. The shaft I also carries a beveled pinion, Q', the teeth of which engage with those of the toothed segment Q², also beveled and rigidly attached at its center to the switch H', which is fulcrumed at H², and capable of being moved into connection with any one of the contact-points S' S² S³, &c.

The field-magnet B, in addition to the main magnetizing-helix G, is provided with a series of fine-wire helices, T' T² T³, &c. One of the terminal wires of helix T' is connected to the stop S', while the other terminal passes to helix T², touching on the way at contact-point S². Similarly, the wire connecting the helices T² and T³ is connected to the contact-point S³. The terminal wire of the helix T³ is connected to the line 2 at the point U. As the wire 4 is connected to the fulcrum of the switch H' when said switch is placed upon the contact-stop S', a portion of the current from the main line will traverse all the fine-wire helices, the winding of which is such that the current will circulate through them in the reverse direction to that traversing the helix G. This current will constitute a derived or fractional current of that in said helix G, and, as it flows in the reverse direction, its effect will be to neutralize the magnetism developed in the pole-piece B. If, now, the switch H' be placed upon contact-stop S², the reverse current will no longer traverse the coil T', but will circulate through the remaining shunt or fine-wire helices. Similarly, if the switch be placed upon the contact-stop S³, the helix T² will be eliminated from the said shunt-circuit. The position, therefore, of the switch H' will determine the degree of magnetism manifested by the pole-piece B. The position of the switch H' depends upon the movements of the shaft I, as explained above, and hence upon the electro-magnetism developed in the pole-piece F² of the electro-magnet F. It will therefore be understood that as the strength of current increases in the main line it will, on passing a predetermined strength, (capable of regulation by means of the adjusting-screw E²,) set in operation the device which is to diminish its strength. Thus my device automatically maintains a uniform strength of current upon the main line.

I do not narrowly limit myself to the exact devices and appliances which I have shown, it being evident that the theory of my invention is capable of being embodied in a variety of ways.

The exact details of the electro-magnetic mechanism which I have herein shown for operating the switch which is to introduce the differential coils are not herein independently claimed, the same being claimed in another pending application filed by me of even date herewith.

I claim as my invention—

1. The combination, substantially as hereinbefore set forth, of a main magnetizing-helix, a secondary helix surrounding said main magnetizing-helix, and means for causing the current to traverse more or less of said secondary helix in a reverse direction to the current traversing said main magnetizing-helix, for the purpose of modifying the generative action of said generator.

2. The combination, substantially as hereinbefore set forth, of the field-magnet of a dynamo-electric machine, a main magnetizing-helix therefor, one or more secondary helices surrounding said main magnetizing-helix, and mechanism for introducing said secondary helices into and withdrawing them from a shunt-circuit spanning said main magnetizing-helix for the purpose of varying its effects.

3. The combination, substantially as hereinbefore set forth, of the main magnetizing-helix of the field-magnet of a dynamo-electric machine, one or more secondary helices surrounding said main magnetizing-helix, and switch mechanism for introducing said secondary helices successively into a shunt-circuit spanning said main magnetizing-helix and wound in the reverse direction thereto.

4. The combination, substantially as hereinbefore set forth, of a main magnetizing-helix of the field-magnet of a dynamo-electric machine, differentially-wound conductors surrounding said main magnetizing-helix, and mechanism, substantially such as described, for automatically varying the length of said conductors correlatively with variations in the strength of current generated.

5. The combination, substantially as hereinbefore set forth, of a main magnetizing-helix of a dynamo-electric machine, a series of opposing helices, a switch for including said helices in a shunt-circuit spanning said main magnetizing-helix, and a device operated by variations in the electro-magnetism produced by the main current for operating said switch.

6. The combination, substantially as hereinbefore set forth, of a main magnetizing-helix of the field-magnet of a dynamo-electric machine, the helices of which are included in the main circuit, a shaft revolved by the attraction of a magnet for a series of armatures, a switch operated by changes in the angular position of said shaft, and differential helices introduced into and withdrawn from a shunt-circuit spanning said main magnetizing-helix, according to the position of said switch.

In testimony whereof I have hereunto subscribed my name this 14th day of August, A. D. 1882.

ROBERT J. SHEEHY.

Witnesses:
DANIEL W. EDGECOMB,
CHARLES G. TERRY.